United States Patent [19]

Stottman

[11] Patent Number: 5,016,509
[45] Date of Patent: May 21, 1991

[54] COMBINATION HANDGUIDE AND MEASURING TOOL FOR USE WITH TABLE MOUNTED WOOD WORKING EQUIPMENT

[76] Inventor: Richard Stottman, 342 Blue Ridge, Louisville, Ky. 40223

[21] Appl. No.: 233,810

[22] Filed: Aug. 19, 1988

[51] Int. Cl.[5] ............................................. B27B 25/10
[52] U.S. Cl. ........................................ 83/437; 83/425; 83/435.1; 83/477.2; 83/522.17; 33/555.2; 33/672
[58] Field of Search ................ 83/423, 409, 437, 701, 83/435.1, 68, 478, 425, 438, 440.2, 522, 522.17, 522.18, 477.2; 144/251 R, 242 R; 33/178 B, 428, 672, 677, 555.2

[56] References Cited

U.S. PATENT DOCUMENTS

| | | | |
|---|---|---|---|
| 1,092,518 | 4/1914 | Brooks | 83/437 |
| 2,410,467 | 11/1946 | Valentine | 83/437 |
| 3,296,911 | 1/1967 | McLane | 83/437 |
| 3,521,683 | 7/1970 | Kirkpatrick | 83/409 |
| 3,858,325 | 1/1975 | Goerler | 33/178 B |
| 4,348,925 | 9/1982 | Manweiler | 83/435.1 |
| 4,370,909 | 2/1983 | Jennings | 83/478 |
| 4,485,711 | 12/1984 | Schnell | 83/437 |
| 4,603,612 | 8/1986 | Atkins | 83/437 |
| 4,656,745 | 4/1987 | Griffin | 83/438 |

Primary Examiner—Frank T. Yost
Assistant Examiner—Eugenia A. Jones
Attorney, Agent, or Firm—Jon C. Winger

[57] ABSTRACT

The invention consists of a combination safety guide and measuring tool providing a safe, reliable means for advancing wood over or through table mounted wood working equipment, and in addition, providing a measuring tool for many important wood working problems. Among the unique features provided by this device are a conventional push tool, a means for measuring the distance of the cutting tool from the wood piece, and a means for accurately measuring the height of the cutting instrument. Because of the unique design of this invention, the worker can perform many measuring functions without the necessity of several measuring tools and, in addition, have a safe, reliable pushstick for moving the wood piece through the wood working equipment.

20 Claims, 3 Drawing Sheets

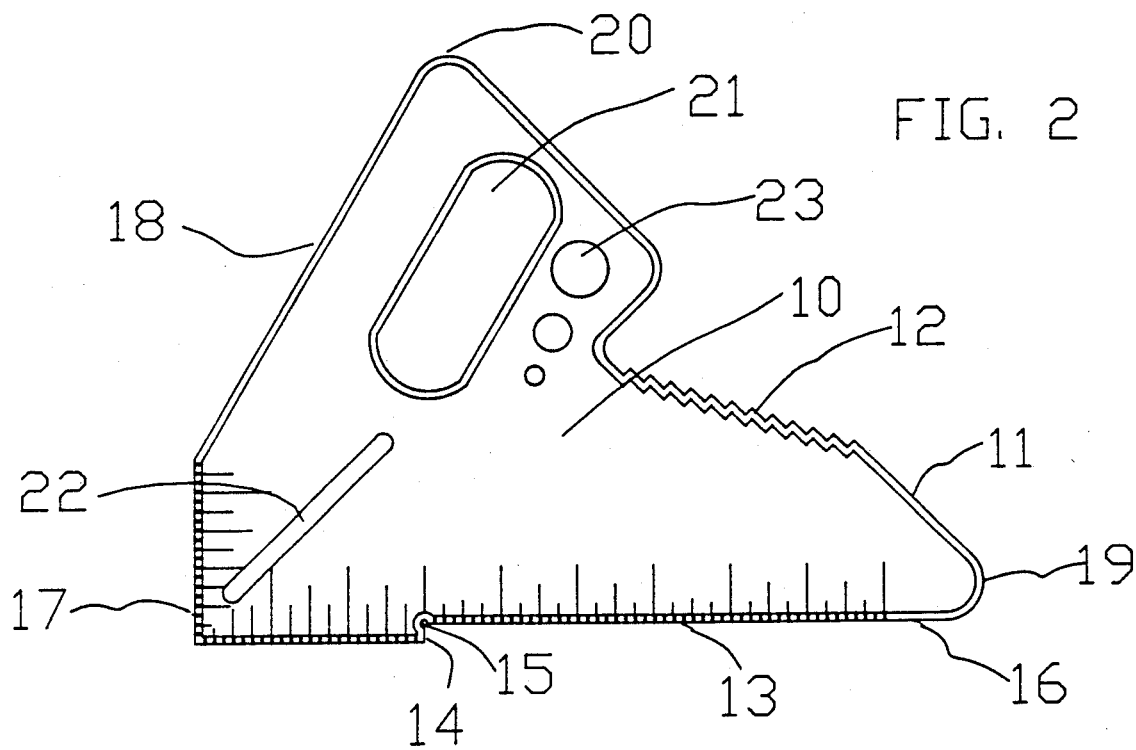
FIG. 2
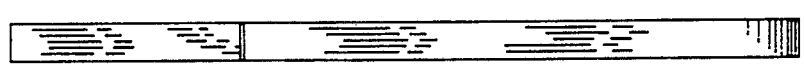
FIG. 4
FIG. 5
FIG. 3
FIG. 6

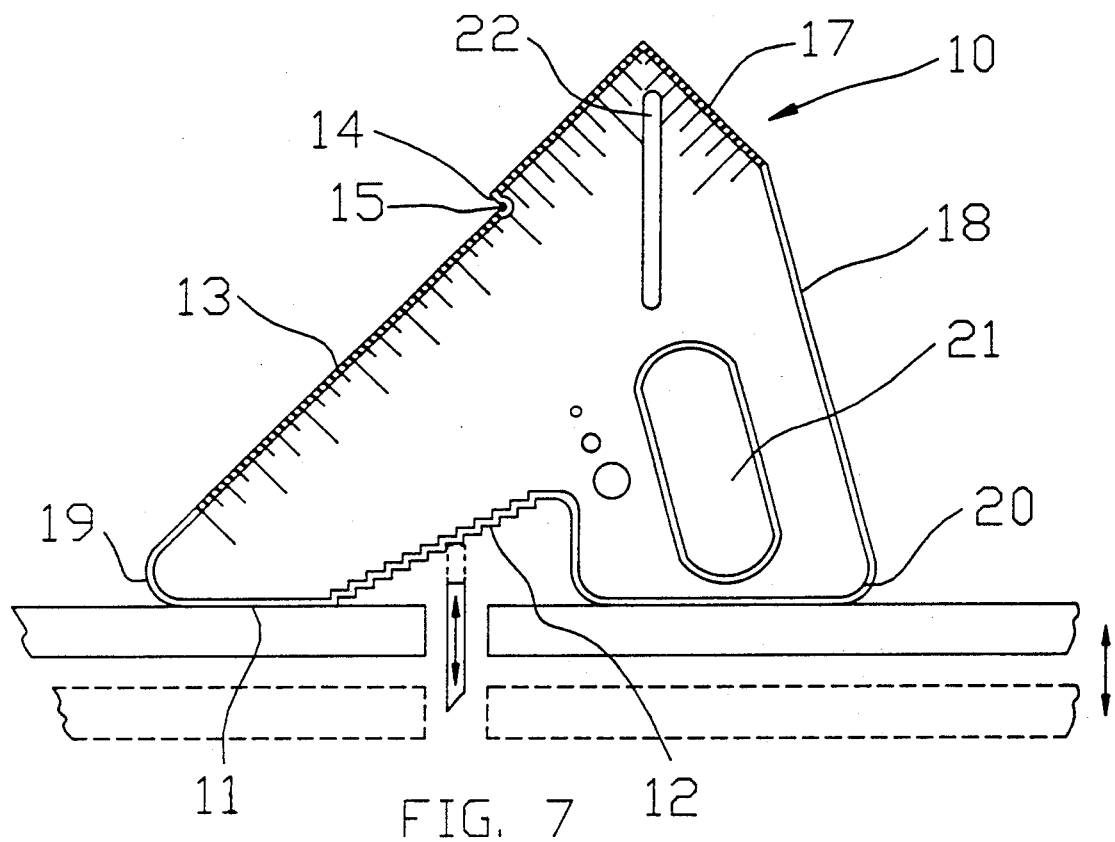
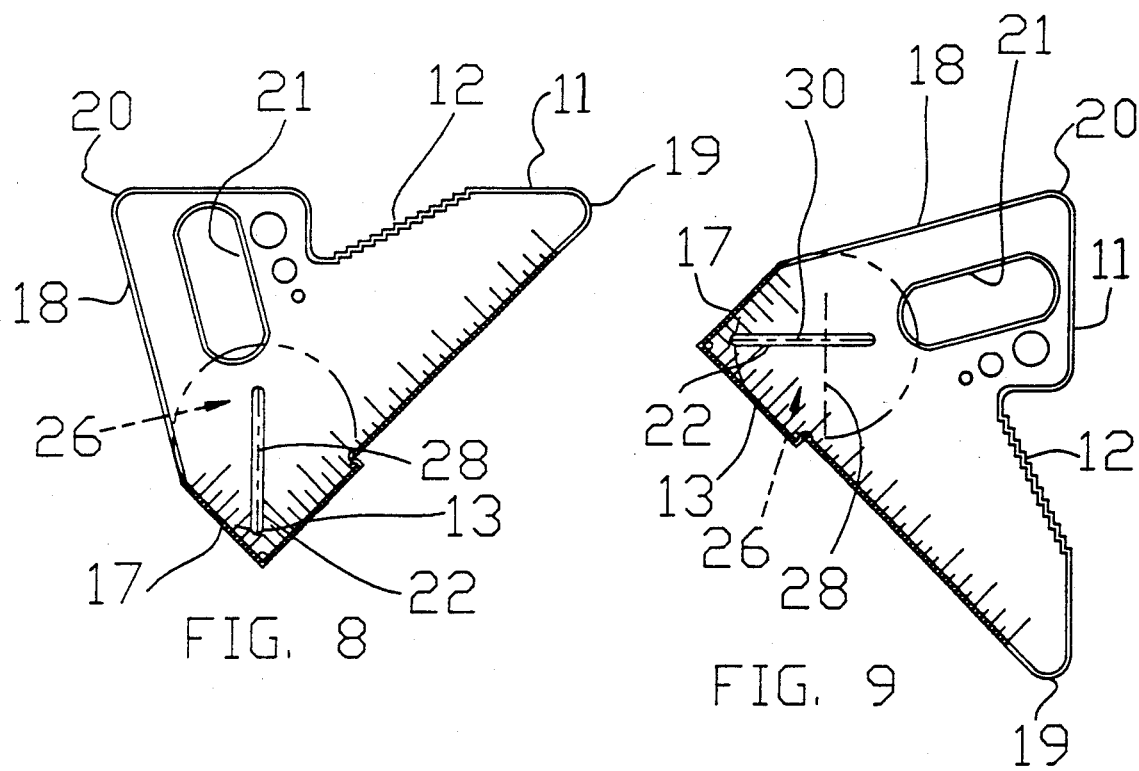

COMBINATION HANDGUIDE AND MEASURING TOOL FOR USE WITH TABLE MOUNTED WOOD WORKING EQUIPMENT

BACKGROUND OF THE INVENTION

1. Field of Invention

This invention relates to wood working equipment. In particular, this invention relates to a combination handguide and measuring tool which can be used with table mounted wood working equipment such as table saws, jointers, planars, routers, etc.

2. Prior Art

In wood working operations such as the ripping, routing or jointing of wood, the operator of the machine uses a saw guard, push stick and other safety type equipment to prevent accidental injuries to fingers, hands and arms when the work piece is being operated on by the machine. In addition, when accurate control of the work piece is deficient, problems may arise, not the least of which can be a diminution in the maintenance of prescribed dimensional tolerances in the work piece. To accomplish both of these desired goals, the traditional push stick, a notched stick which is placed on the work piece, is used to push the work piece through the wood working operation.

Conventional push sticks are well known as shown in, for example, Fine Wood Working, p. 53 (Spring 1977) and Fine Wood Working, p. 12 (January/February 1979).

A common "push stick" is also disclosed in U.S. Pat. No. 4,001,903. The '903 patent discloses a wood working device comprised of a handle having a triangular and eccentrically notched working end provided with a right angle to push wood through the wood working equipment. While this push stick is better than no push stick, it has several inherent deficiencies. For example, the shaft does little to hold the wood securely in place, thus permitting the wood to buck off the flat surface during the wood working operation. In addition, there is no control of the left to right movement of the wood as it passes through the wood working equipment. Further, there is insufficient engagement with the top surface of the wood resulting in the wood "bucking" if hard spots exist in the wood. Finally, there is always the possibility that the push stick will slip, causing the hands of the operator to move toward the cutting edge of the wood working equipment.

Better designed push sticks have a handle and a guidebody for pushing the wood through the wood working equipment. Some of these devices have a replaceable bottom part when the device comes into contact with the wood working equipment. See for example, U.S. Pat. No. 4,348,925. Others have openings in the bottom of the push stick through which a saw blade can pass as the push stick is being used. See for example, U.S. Pat. No. 4,370,909.

Others employ different methods for pushing the wood through the wood working equipment. See, for example, U.S. Pat. No. 2,839,100 which uses a number of rigid stud-type devices which grab the wood and push it through the wood working equipment.

Another type of wood working device fits over the rip fence or rip rail of a table saw and contains an extended notch for pushing wood through a table saw. See U.S. Pat. Nos. 4,603,612, 4,485,711 and 2,410,467.

Thus, there are numerous devices for the pushing of wood through wood working equipment, especially table saws.

In addition, there are many conventional measuring tools for determining distances, degrees and angles, all of which come into use when wood is being altered by wood working equipment. However, none of the devices previously disclosed provide a combination handguide for pushing wood through the wood working equipment and a tool for performing a multitude of measuring operations such as: setting the height of the blade of a table saw, setting the angle of the blade of a table saw for a 22½ degree, 30 degree, 60 degree or 90 degree miter cut, measuring the length or height of the woodpiece determining the center of a shaped woodpiece and the many other measuring operations performed on a daily basis by people in wood working.

Therefore, it is an object of this invention to provide a combination handguide and measuring tool for use with wood working equipment.

It is another object of this invention to provide a combination handguide and measuring tool which will safely and securely push wood through a wood working operation.

It is a still further object of this invention to provide a combination handguide and measuring tool for determining the height of a saw blade and for performing many other measuring operations in wood working.

These and other objects and features of the present invention will become apparent to those skilled in the art from a consideration of the following detailed description, drawings and claims. The description along with the accompanying drawings provide a selected example of construction of the device to illustrate the invention.

SUMMARY OF THE INVENTION

In accordance with the present invention there is provided a combination safety guide and measuring tool for use with wood working equipment comprising a generally four sided device wherein the first side contains a plurality of stepped insets, the second side is set at approximately a 45 degree angle to the first side and contains a hooked step portion, the third side is set at approximately a 90 degree angle to the second side and the fourth side is rotated approximately 30 degrees from the third side in the direction of the first side.

This combination safety guide and measuring tool provides a safe, reliable means for advancing wood over or through table mounted, wood working equipment and in addition, provides a multifaceted tool useful for the measurement of many important wood working operations. Because of the unique design of this device, the wood worker can perform many measuring functions without the necessity of several measuring tools and, in addition, have a safe, reliable push stick for moving the wood piece through the wood working equipment.

BRIEF DESCRIPTION OF THE DRAWINGS

This invention will now be described with reference to the accompanying drawings in which:

FIG. 2 is a side view of the tool.

FIG. 3 is an end view of the tool looking at sides three and four.

FIG. 4 is an end view of the tool looking at side one.

FIG. 5 is a bottom view of the tool.

FIG. 6 is a top view of the tool.

FIG. 7 is a side view of the tool located on the table of a table saw for adjusting the height of the cutting tool of the table saw;

FIGS. 8 and 9 illustrate use of the tool for determining the center of an article.

DETAILED DESCRIPTION OF PREFERRED EMBODIMENT

Figure 1:
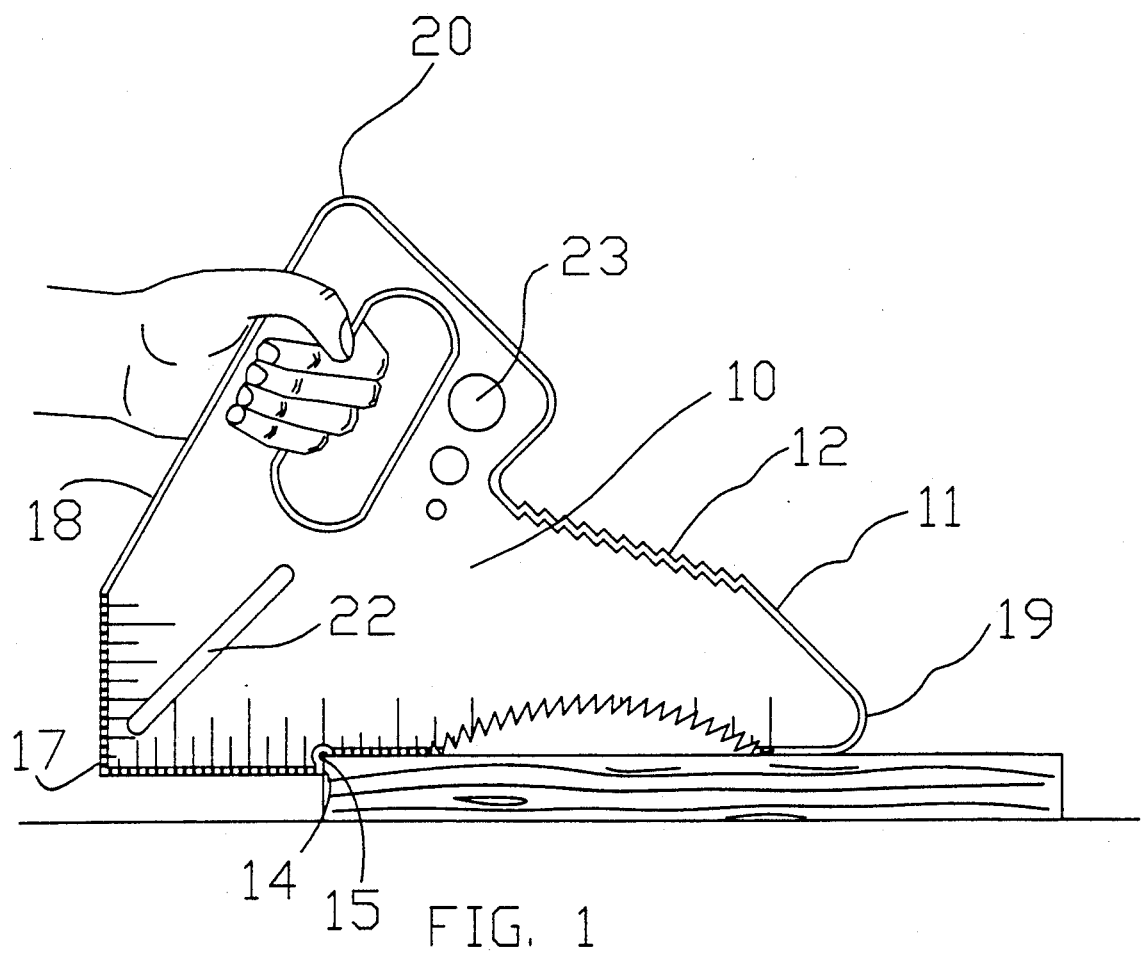
FIG. 1 is a side view showing the tool pushing wood through a table saw operation.

Although the invention is adaptable to a wide variety of uses, it is shown in the drawings for the purpose of illustration as embodied in a combination safety guide and measuring tool (10) for use with table mounted wood working equipment (2) such as a power saw, jointer, sander, or router. The combination safety guide and measuring tool is generally a four-sided tool having a first side (11) which contains a number of stepped insets (12) with each step increasing by about 1/16 to ⅛ of an inch in depth measured perpendicularly to the first side (11). See FIGS. 1 and 2. Each step is approximately ⅛ to about ¼ of an inch in width and is inset to a depth ranging from about 1/16 to about 2½ inches from the surface of side one. These stepped insets can be used for example to precisely set the height of a cutting tool (4) of the wood working equipment. For example, if a table saw is used, by use of the various insets, the height of the saw blade can be precisely set. Specifically, the table saw blade when not running can be placed under the stepped insets (12) of the first side. By placing the blade under the particular stepped inset with the appropriate depth designation, the saw blade can be adjusted to fit the needs of the woodworker. The first side preferably will vary from about 6 to about 18 inches in length.

With reference to FIG. 7, in the use of saw, jointer, sander, and router equipment it is necessary to adjust the height by which the cutting tool (4) projects above the table (6) of the wood working equipment (2) in order to make a predetermined depth of cut in a workpiece. This is accomplished in known wood working equipment by either moving the cutting tool upwardly or downwardly relative to the table of the wood working equipment, or by moving the table upwardly or downwardly relative to the cutting tool of the wood working equipment. In order to accurately set the cutting tool of the wood working equipment at a preselected projecting dimension above the table corresponding to the predetermined depth of cut to be made in the work piece, the measuring tool (10) is first placed on the table with the first side (11) in abutment with the top surface of the table and with the stepped insets (12) located over and spanning the cutting tool to be adjusted. The measuring tool (10) is moved back and forth longitudinally of the first side (11) to position a selected one of the insets (12), which corresponds to the preselected dimension by which the cutting tool is to project above the table to make the predetermined cut in the work piece, directly above and in alignment with the cutting tool. Then, either the cutting tool is moved upwardly or downwardly relative to the table, or the table is moved upwardly or downwardly relative to the cutting tool to bring the top side or edge of the cutting tool into contact with the selected one of the insets (12) as indicated by the phantom lines of FIG. 7. Because the depth of each inset (12) measured from the first side (11) of the measuring tool (10) is different and known, as described above, the exact projecting dimension of the cutting tool from the table of the wood working equipment in contact with the selected one of the insets (12) is, therefore, known.

The second side (13) is generally flat though it does contain a hooked, stepped portion (14) wherein the step is somewhat lower than the remaining level of the second side, preferably stepped down from about 1/16 to about ¾ of an inch. The upper edge of this step contains a hooked indention (15) to allow for irregularities in the edge of the woodpiece being pushed by the tool. This hooked indentation is preferably about 1/16 to about ½ inch across. This hooked, stepped portion of the tool is set against the edge of a wood piece to push it through the wood working equipment as can be best seen in FIG. 1. An edge of this second side preferably contains a graduated scale (16) which measures both from the hooked portion of the step to an end of that side and from the opposite end of that side to the hooked portion. This graduated edge provides a precise measuring guide for measuring the wood piece for wood working operations. Of course, this graduated scale can be in conventional inches or metric measurement. For convenience this second side of the tool should preferably be from about 6 to about 18 inches in length.

The third side (17) of the tool is set at approximately a 90 degree angle from the end of the second side closest to the stepped portion. By use of this 90 degree angle, the tool can be used to accurately position blades, fences, jigs and other wood working machinery which require a square side. In addition, by laying the third side of the tool flat against a fence of a table saw, the distance from the fence to the blade can be accurately measured by use of the graduated edge of side two. Further a precise 90 degree angle for the cutting tool can be set by use of this second side. Although the third side can be of any convenient length, in a preferred embodiment, it ranges from about 2 to about 6 inches. In a preferred embodiment this third side is also scored by a graduated scale for measuring purposes.

The fourth side (18) of the tool is set at about 30 degrees to the third side directed toward side one as shown in FIG. 2. Its length can vary from about 6 to about 12 inches. Although the fourth side can be of any convenient length, its length is determined by the other three lengths and the angles at the three other corners. Both the edge (19) joining the first side to the second side and the edge (20) joining the first side to the fourth side are rounded for ease of use. Set within the tool is a handle (21) opening for use as a grip handle. This grip handle is generally an opening parallel to the fourth side. Its size and shape are sufficient for the convenient holding of the device by the person using the tool and is preferably oval.

An elongated opening (22) is also provided running from just inside of the edge formed by sides two and three a distance of about 2 to about 5 inches bisecting the 90° angle formed by the second side (13) and third side (17). This opening is most valuable in determining the center of a shaped article, such as a square, round, hexagonal or octagonal work piece.

With reference to FIGS. 8 and 9, the center of an article can be readily determined by a two step process. First, the tool is laid flat on the surface of the article at a first position with the second side (13) in alignment with an edge of the article or workpiece (26) and the third side (17) in alignment with an edge of the article, a marking instrument, such as a pencil or scribe, is placed in the elongated opening (22) as a guide for the marking instrument and the marking instrument is moved along the length of the elongated opening (22) marking a corresponding straight first line (28) on the article surface beneath the tool. Second, the tool is repositioned on the surface of the article to a second position rotated in the plane of the article surface from the first position by an appropriate angle, for example 90°, such that the elongated opening (22) intersects the previously made first line on the surface and with the second side (13) in alignment with an edge of the article (26) and the third side (17) in alignment with an edge of the article, the marking instrument is placed in the elongated opening (22) and the marking instrument is moved along the length of the elongated opening (22) marking a corresponding straight second line (30) on the article surface beneath the tool intersecting the first line. The intersection of the first line and second line on the article surface define the center of the article.

In a preferable embodiment, the tool also contains a plurality of circular openings (23) in the body of the tool, graduated in size ranging from about 1/16 of an inch to about one inch in diameter. See FIG. 2. In a preferred embodiment from about 3 to about 16 openings each slightly larger than the preceeding opening are provided. These openings can be useful for measuring the diameter of bits, nails, screws or the like.

The tool can be manufactured from any material such as wood, plastic or soft metal such as aluminum or brass.

The tool can be of any thickness conventionally used for such tools. However, the edges of the tool are preferably approximately ¼ to about 2 inches to allow the tool to set flat on the wood piece. See FIGS. 3, 4, 5 and 6.

In use this tool (10) has several advantages over currently existing handguides for wood working equipment. The tool acts as a push stick for safely pushing wood through wood working equipment such as table saws, jointers, planers, sanders, etc. It securely holds the wood and prevents it from bucking or twisting as it is pushed through the wood working equipment. See FIG. 1. In addition, the tool provides an accurate method for angling the blade in a table saw. Further, the tool provides various angles for mitering cuts on wood with angles of about 22.5, 30, 45, 60 and 90 degrees. Most interestingly the tool provides a very accurate method of establishing the height of the cutting tool of the wood working equipment such as for setting the heighth of the blade on a table saw or other tool such as a router. The tool can also act as a measuring tool for setting the distance from the saw blade to the fence of wood working equipment. In addition, the small hooked indentation (15) contained on the lip of the stepped portion (14) of side two (13) of the tool provides clearance for an irregular edge on any wood being cut by the wood working equipment. The tool also provides a scribed opening (22) for easily finding the center of a square, rounded or regularly shaped wood pieces. Finally, this tool provides a series of circular openings (23) to determine the size of various small objects such as bits, nails, screws, etc. No other tool can provide all of these functions and still provide a safe, reliable push stick for pushing wood through wood working equipment.

What is claimed is:

1. A combination safety guide and measuring tool for use with table mounted wood working equipment comprising a generally four sided device wherein the first side contains a plurality of stepped insets, the second side is set at approximately a 45 degree angle to the first side and contains a hooked step portion, the third side is set at approximately a 90 degree angle to side two and the fourth side is set at approximately 30 degrees from the angle of the third side in the direction of the first side.

2. The combination safety guide and measuring tool of claim 1 wherein the plurality of stepped insets is a set of stepped insets, each step approximately ⅛ to about ¼ of an inch in width with each inset increasing about 1/16 to about ⅛ of an inch in depth such that the insets range from about 1/16 of an inch to about 2½ inches in depth.

3. The safety guide and measuring tool of claim 1 wherein there is contained therein a grip handle approximately parallel to the fourth side and of sufficient size and shape to allow for the convenient holding of the device by the person using the tool.

4. The combination safety guide and measuring tool of claim 1 wherein the hooked portion is sufficiently hooked to allow for irregularly shaped pieces of wood stock to be pushed by the tool wherein said hooked portion is approximately 1/16 to about ½ inch across.

5. The combination safety guide and measuring tool of claim 1 set at approximately a 45 degree angle from the point formed by the meeting of side two and side three away from the edge of the tool is an oval scribe opening about 2 to about 5 inches in length.

6. The combination safety guide and measuring tool of claim 1 wherein at least one of the sides is about 6 to about 18 inches in length and has a graduated scale.

7. The combination safety guide and measuring tool of claim 1 wherein said tool is produced from the group of materials consisting of wood, plastic and a soft metal.

8. The combination safety guide and measuring tool of claim 1 wherein the thickness of the edge of the tool is preferably from about ¼ to about 2 inches.

9. The combination safety guide and measuring tool of claim 1 wherein at least two sides have graduated scales.

10. The combination safety guide and measuring tool of claim 1 wherein there are a plurality of measured openings in the body of the tool ranging in size from about 1/16 of an inch to about one inch in diameter.

11. A combination safety guide and measuring tool for use with table mounted wood working equipment comprising a generally four sided device wherein the first side contains a plurality of stepped insets, the second side is set at approximately 45 degree angle to the first side and contains a hooked step portion, the third side is set at approximately a 90 degree angle to side two and the fourth side is set at approximately 22½ degrees from the angle of the third side in the direction of the first side.

12. The combination safety guide and measuring tool of claim 2 wherein the plurality of stepped insets is a set of stepped insets, each step approximately ⅛ to about ¼ of an inch in width with each inset increasing about 1/16 to about ⅛ of an inch in depth such that the insets range from about 1/16 of an inch to about 2½ inches in depth.

13. The safety guide and measuring tool of claim 2 wherein there is contained therein a grip handle approximately parallel to the fourth side and of sufficient size and shape to allow for the convenient holding of the device by the person using the tool.

14. The combination safety guide and measuring tool of claim 2 wherein the hooked portion is sufficiently hooked to allow for irregularly shaped pieces of wood stock to be pushed by the tool wherein said hooked portion is approximately 1/16 to about ½ inch across.

15. The combination safety guide and measuring tool of claim 2 wherein set at approximately a 45 degree angle from the point formed by the meeting of side two and side three away from the edge of the tool is an oval scribe opening about 2 to about 5 inches in length.

16. The combination safety guide and measuring tool of claim 2 wherein at least one of the sides is about 6 to about 18 inches in length and has a graduated scale.

17. The combination safety guide and measuring tool of claim 2 wherein said tool is produced from the group of materials consisting of wood, plastic and a soft metal.

18. The combination safety guide and measuring tool of claim 2 wherein the thickness of the edge of the tool is preferably from about ¼ to about 2 inches.

19. The combination safety guide and measuring tool of claim 2 wherein at least two sides have graduated scales.

20. The combination safety guide and measuring tool of claim 2 wherein there are a plurality of measured openings in the body of the tool ranging in size from about 1/16 of an inch to about one inch in diameter.

* * * * *